F. S. McKENNEY.
PROCESS FOR FORMING METALLIC FASTENERS.
APPLICATION FILED OCT. 21, 1909.
1,189,849.
Patented July 4, 1916.
2 SHEETS—SHEET 1.
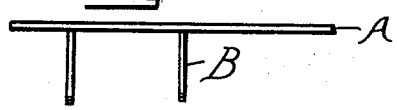
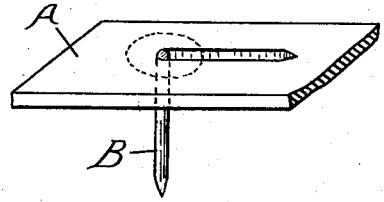
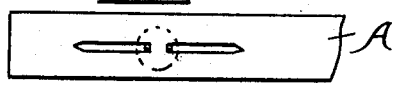
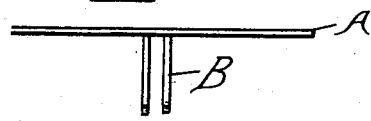
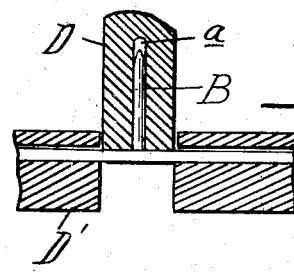
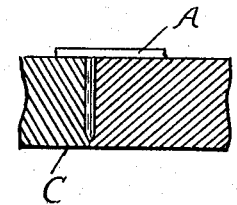
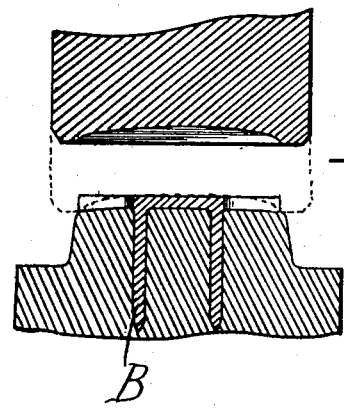
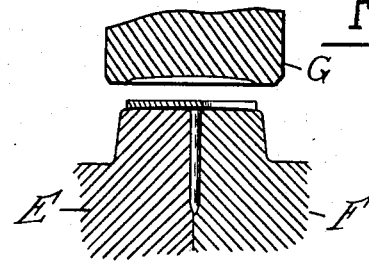
Witnesses
Inventor
Franklin S. McKenney
By
Attorneys F. S. McKENNEY.
PROCESS FOR FORMING METALLIC FASTENERS.
APPLICATION FILED OCT. 21, 1909.

1,189,849.

Patented July 4, 1916.
2 SHEETS—SHEET 2.

Witnesses
Inventor
Franklin S. McKenney
By
Attorneys

UNITED STATES PATENT OFFICE.

FRANKLIN S. McKENNEY, OF DETROIT, MICHIGAN.

PROCESS FOR FORMING METALLIC FASTENERS.

1,189,849.  Specification of Letters Patent.  Patented July 4, 1916.

Application filed October 21, 1909. Serial No. 523,865.

*To all whom it may concern:*

Be it known that I, FRANKLIN S. McKENNEY, a citizen of the United States of America, residing at 124 Euclid avenue east, in the city of Detroit and county of Wayne, State of Michigan, have invented certain new and useful Improvements in Processes for Forming Metallic Fasteners, of which the following is a specification, reference being had therein to the accompanying drawings.

The invention consists in a process for constructing a metallic pronged fastener made from sheet metal, the prong or shank being cut or punched out at right angles, either wholly or partially from the head or from the material from which the head is subsequently to be made, whereby a prong projects from an interior portion of the head in the finished article. The head is rendered solid and symmetrical by entirely closing up the gap or slot made by the punching out of the prong.

The process consists in cutting and punching out a prong from the sheet metal and then cutting out around the prong a head portion, which incloses a portion or all of the slot produced in the cutting of the prong, and then in closing up the gap or slot in the head portion so as to render the same uniformly solid. The closing of this gap or slot may be effected either before the head portion is punched out from the strip, or after.

The invention further consists in the mode of operation hereinafter set forth and particularly pointed out in the claims.

Figure 14:
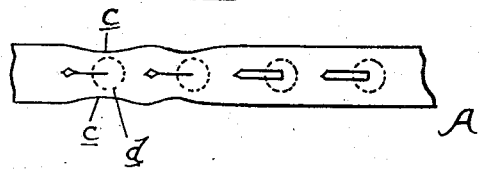
Figure 6:
Figure 11:
Figure 13:
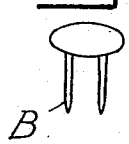
Figure 8:
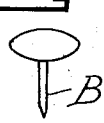
Figure 15:
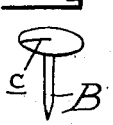
Figure 20:
Figure 16:
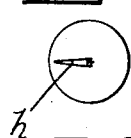
Figure 17:
Figure 18:
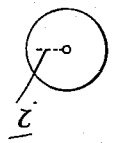
Figure 19:
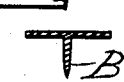

Figure 1 is a bottom plan view of a strip of sheet metal showing a number of prongs punched therefrom; Fig. 2 is a side elevation thereof; Fig. 3 is a perspective view of the blank and one of the prongs, showing the prong rounded and pointed; Fig. 4 is a section illustrating the dies and the blank therein, in the operation of rounding and finishing the prong or shank; Fig. 5 is a section through the die used in cutting and punching out the head from the metal strip; Fig. 6 shows the fastener in the condition after the operation shown in Fig. 5, the shank being rounded and the head having a radial slot at one side thereof; Fig. 7 is a section through the dies for closing the slot in the head and rendering the head solid; Fig. 8 is a perspective view of the finished single prong fastener; Fig. 9 and Fig. 10 are views similar to Figs. 1 and 2, illustrating the making of a double prong fastener; Fig. 11 is a perspective view of the double prong fastener corresponding to Fig. 6; Fig. 12 is a section through the dies for making the double prong fastener; Fig. 13 is a perspective view of the finished double prong fastener; Fig. 14 is a plan view of a strip of sheet metal showing the series of prongs punched therefrom and showing the blank having a slot produced by the punching out of the shank; Fig. 15 shows a completed fastener with a closed head, after it is punched from the strip shown in Fig. 14; Figs. 16 and 17 show a plan of a section of a thumb tack in which the entire length of the prong is punched out from the head, leaving the open gap therein; Figs. 18 and 19 are, respectively, a bottom plan view and a section through such fastener, with the gap in the head closed; and Fig. 20 is an elevation of a fastener such as shown in Figs. 8, 14 or 18, with the prong turned into a loop or attaching shank so that it may be used as a button.

In the making of a fastener after my invention, I preferably proceed as follows: I take a strip of sheet metal A of the proper thickness to give the desired strength and diameter to the finished prong, and from this I strike out a prong, B. In regular manufacture, this should be done in a continuous operation in which a series of prongs will be successively struck out from the same strip. These prongs when struck out will be rectangular in cross-section, and may be more or less pointed by the punching-out die. If there is no object in having the same rounded, and sharply pointed, they may be left in essentially the same condition as when punched out in the finished article. Ordinarily, however, it is desirable to have them smoothly rounded and pointed in order that they may not mutilate and weaken the articles to which they may be applied, and, although this may be done subsequently, I prefer to round and point the prongs while they are still held in the metal strip from which they are punched. This may be done by compressing the rectangular prongs between lateral dies C (shown in Fig. 4) independent of the remaining metal which is left in its normal condition. After being pressed in the dies, the prong would be as shown in Fig. 3, rounded and pointed and attached at its upper end to the metal strip. The next preferred operation is the punching out of the head and separating the fastener from the strip, which may be done with a suitable cutting punch, D. This punch D preferably has an interior recess *a* to receive and protect the prong and also so as to perfectly center the prong in relation to the head and cutting dies D'. Any other means of centering and protecting which will effect this result will, however, answer this purpose.

When the fastener is thus punched out from the strip, with this rounded prong, it will be of the construction shown in Fig. 6, and will have a radial slot, *b*, of a length corresponding to the diameter of the head. If the head is a large one, the slot may be substantially the length of the prong, and if a small one, of proportionate length. I have shown in the drawings comparatively small heads and, consequently, comparatively shallow slots therein.

It will be observed that the prong projects from an interior or central point of the head, and, if the fastener was left as shown in Fig. 6, for many classes of work it would be objectionable, either from reasons of appearance or because the lobes or projections on opposite sides of the slot would be apt to be bent or disfigured much more readily than if the head was finished with a uniform or even and smooth edge. The slots or recesses would also afford a lodgment for the collection of dust or other matter, and would thereby be unsightly and objectionable. The classes of work where such slotted construction would be objectionable are, for instance, in the use of same as a button fastener for clothing, shoes, gloves, etc., for saddlery, harness or other goods, straps, attaching buckles, etc.; or for use as a tack which is to be driven with a hammer. I therefore next proceed to render the head solid and symmetrical, which I preferably do by operating upon the fastener-head so as to thin the entire head or the outer portions of the same, round off the marginal edge and cause the metal to flow into and close the slot in the head; thus rendering the same perfectly solid and smooth. When properly so made, as I have demonstrated by the actual making of these fasteners, this process will so perfectly form the head that no ordinary visual observation will enable one to detect the point at which the slot had previously been.

The dies which I prefer to employ for solidifying the head are shown in Fig. 7, the lower die being composed of two parts, E and F, having complementary grooves in their meeting faces to receive the prong, the top of the die being slightly convexed. The upper or embossing die G is concave, as shown, so that either the margin of the head may be reduced when the dies come together or the entire head is compressed sufficiently to cause the metal to flow into the slot and close it. By making the lower die slightly convex the under face of the head of the finished article will be correspondingly shaped, which is a desirable feature, especially when the fastener is used to secure a button or other article to fabric or leather. This construction gives a contacting surface to the fastener-head on the fabric or leather around its entire circumference and takes off the strain directly at the shank where such strain would be apt to tear the goods.

After the operation described, shown in Fig. 7, the completed fastener will be as shown in Fig. 8.

In making the double-pointed fastener, I strike out the prongs as shown in Figs. 9 and 10, round them up by the dies C, punch out the head to form the construction shown in Fig. 11, and then place them in the die shown in Fig. 12, to perfectly close up the gaps by the flowing of the metal therein.

Instead of closing the gap after the disk or head portion of the fastener has been cut from the blank or strip, this closing operation may be effected before the head portion is cut from the strip, which I have shown in Fig. 14, at the right hand of which I show prongs punched out the same as shown in Fig. 1. Then, as the strip progresses, lateral dies of any suitable construction (not shown) may be brought to bear against the opposite edges of the strip opposite that portion of the slot which is to be in the head of the finished article. These lateral dies will produce the depressions *c* on opposite sides of the blank, and will close up that portion of the gap which is to be within the head. Afterward the strip may be punched on the dotted lines *d* (Fig. 14) and deliver the fastener I, as shown in Fig. 15.

This fastener may have its prong rounded and pointed in the manner shown in Fig. 4, and the line indicating the point of closure of the slot may be entirely eliminated if desired, by treating it in dies E, F and G, shown in Fig. 7. For rough work, however, the fastener shown in Fig. 15 may be the completed article, showing only a faint line where the parts unite.

In Figs. 16 and 17 I have shown a well-known form of thumb tack, having a slot *h* wholly within the head. This slot may be closed also to make a solid head, by the dies E, F and G, in the same manner as already described. I have indicated the line of closure by the dotted lines *i* in Fig. 18.

It is obvious that instead of leaving the prong straight and pointed, as shown in Figs. 8, 14 and 18, it may be turned and formed into a loop if it is desired to use the fastener as a button; and therefore where I refer to the prong, unless it is otherwise definitely pointed out as being a pointed prong, I mean to include such a prong, either pointed for tack or similar purposes or bent into a loop for the shank of a button.

In many cases it is desirable to have such a fastening device as I have shown, with a relatively thick prong, but where it is not necessary to have a head of the same thickness. It is obvious that with my invention, the sheet metal from which the article is formed may be of the thickness desired to give the proper dimensions to the prong and that a head may then be swaged to the desired thinness in the formation of the head and the closing of the slot; for instance, in glove fasteners, or fasteners for use on other clothing, it is desirable to have as thin and smooth a head as possible and yet have the prong of sufficient strength to perform its work. This is also true in rivets, in which work I can make a prong or prongs, in the single or double pointed rivets, of the material thickness while the head can be thinned down by swaging much thinner than the prong or prongs.

In certain classes of work, and especially in the double prong fastener, where the prongs are clenched by bending outward, as in copper rivets, they are ordinarily made at the present time with such outer faces round, this being an objectionable feature. By using suitably shaped lateral compressing dies, C, or by leaving the prong in its original rectangular shape, I may have the impinging faces of these clenched portions flat and thus enable them to clench down closer than with devices having rounded surfaces.

The fasteners thus described embodying my invention have all the advantages of fasteners punched or cut out of solid metal and the finish and appearance is exceptionally good.

What I claim as my invention is:

1. The herein-described process of forming the head of a metallic fastening from a blank having a head and a prong, the prong projecting from the inner end of a slot in the head portion and at an interior point thereof, consisting in compressing the head portion to cause the metal in the head to move into and fill the slot to render the head solid.

2. The process of making a metallic fastening from sheet metal, consisting in cutting and forming a blank from sheet metal, comprising a prong and a slotted head, the prong projecting at right angles from the inner end of the slot, and then in compressing the head to cause the metal thereof to fill the slot and render the head solid.

3. The process of making a metallic fastening consisting in cutting and forming a blank from sheet metal comprising a prong and a slotted head, the prong projecting at right angles from the inner end of the slot, and then in compressing the head to thin the same to cause the metal thereof to fill the slot and render the head solid.

4. The process of making a metallic fastening consisting in cutting and forming a blank from sheet metal comprising a prong and a slotted head, the prong projecting at right angles from the inner end of the slot, and compressing the prong to shape the same and then in compressing the head to cause the metal thereof to fill the slot and render the head solid.

In testimony whereof I affix my signature in presence of two witnesses.

FRANKLIN S. McKENNEY.

Witnesses:
ADELAIDE F. ADAMS,
JAMES P. BARRY.

Copies of this patent may be obtained for five cents each, by addressing the "Commissioner of Patents, Washington, D. C."